US 008752443B2

(12) United States Patent
Bai et al.

(10) Patent No.: US 8,752,443 B2
(45) Date of Patent: Jun. 17, 2014

(54) GEAR SELECTOR APPARATUS AND CONTROL FOR A VEHICLE TRANSMISSION

(75) Inventors: Shushan Bai, Ann Arbor, MI (US); Vijay A. Neelakantan, Rochester Hills, MI (US); Paul G. Otanez, Troy, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 378 days.

(21) Appl. No.: 12/816,086

(22) Filed: Jun. 15, 2010

(65) Prior Publication Data

US 2011/0303033 A1    Dec. 15, 2011

(51) Int. Cl.
  *F16H 59/00*    (2006.01)
  *F16H 61/00*    (2006.01)
  *F16H 63/00*    (2006.01)

(52) U.S. Cl.
  USPC ............................. 74/335; 74/473.1; 477/154

(58) Field of Classification Search
  USPC ........ 74/335, 473.21; 475/149; 477/154, 143, 477/126
  See application file for complete search history.

(56) References Cited

U.S. PATENT DOCUMENTS

| 4,531,422 | A | * | 7/1985 | Yarnell ...................... 74/473.11 |
| 4,878,392 | A | * | 11/1989 | Jaeger et al. ..................... 74/333 |
| 5,207,113 | A | * | 5/1993 | Desautels et al. .......... 74/473.21 |
| 6,131,476 | A | * | 10/2000 | Miyazaki ........................ 74/335 |
| 6,189,396 | B1 | * | 2/2001 | Barnreiter et al. ............... 74/335 |
| 6,397,698 | B1 | * | 6/2002 | Kamiya et al. ............. 74/473.11 |
| 6,502,652 | B2 | * | 1/2003 | Rogg ......................... 180/65.21 |
| 6,585,613 | B1 | * | 7/2003 | Walter et al. ...................... 474/8 |
| 6,612,196 | B1 | * | 9/2003 | Petzold ...................... 74/473.11 |
| 6,889,570 | B2 | * | 5/2005 | Kayano et al. ................... 74/339 |
| 7,059,462 | B2 | * | 6/2006 | Brissenden et al. ..... 192/48.601 |
| 7,201,266 | B2 | * | 4/2007 | Brissenden et al. ........ 192/85.63 |
| 2002/0038574 | A1 | * | 4/2002 | Kamiya et al. .................. 74/335 |
| 2002/0042318 | A1 | * | 4/2002 | Brown et al. .................. 475/204 |
| 2002/0155916 | A1 | * | 10/2002 | Brown et al. .................. 475/204 |
| 2008/0047381 | A1 | * | 2/2008 | Cronin ............................ 74/335 |
| 2008/0295634 | A1 | * | 12/2008 | Olds et al. .................. 74/473.37 |
| 2011/0303033 | A1 | * | 12/2011 | Bai et al. ......................... 74/335 |

* cited by examiner

*Primary Examiner* — Troy Chambers
*Assistant Examiner* — Alexander Vu

(57) ABSTRACT

A gear selector apparatus for a transmission having a first gear and a second gear selectively engageable to a shaft through a synchronizer. The gear selector apparatus includes a hydraulic actuator, a gear selection fork engaged with the actuator, a guide bar fixed for common movement to the gear selection fork, a detent mechanism disposed in contact with a first edge of the guide bar, a position sensor disposed in contact with a second edge of the guide bar, a first and a second pressure control valve in communication with the hydraulic actuator, a controller in electrical communication with the position sensor and the first and second pressure control valve. The controller includes a control logic sequence.

15 Claims, 4 Drawing Sheets

| Gear Selection Fork Position | 1st Position Switch State | 2nd Position Switch State |
|---|---|---|
| 1st Gear Position | On | Off |
| 2nd Gear Position | Off | On |
| Neutral Position | On | On |

GEAR SELECTOR APPARATUS AND CONTROL FOR A VEHICLE TRANSMISSION

FIELD

The present invention relates generally to a gear selector apparatus and control for a transmission, and more particularly to a gear selector apparatus having a single area piston with a position sensor to achieve three position control of a synchronizer in a transmission.

BACKGROUND

The statements in this section merely provide background information related to the present disclosure and may or may not constitute prior art.

Typical gear selector apparatus for dual-clutch or automated manual transmissions employ a hydraulic, electro-mechanical or electromagnetic actuator to achieve closed-loop position control of a synchronizer. However, these systems require the use of expensive position sensors to identify the position of the synchronizer. Utilizing these techniques in gear selector apparatuses have proven costly and typically require complicated operating algorithms.

Another alternative for actuation of a dual-clutch or automated manual transmission uses a dual-piston or three-area hydraulic actuators. Whereas these types of actuators do not require position sensors in operation, the three necessary positions of the synchronizer are monitored with position switches. Still, the dual-piston or three area actuators are themselves complicated and require larger packaging space.

While these piston actuators are useful for their intended purpose, there is a constant desire to reduce the complexity of the both the control algorithm and the assembly and to improve the packaging efficiency of the gear selector apparatus while providing robust and reliable operation at a lower cost. Accordingly, there is room in the art for an improved gear selector apparatus having a compact package for a confined space application, improved cost and a simpler control algorithm.

SUMMARY

The present invention provides A gear selector apparatus for a transmission having a first gear, a second gear and a synchronizer for selectively engaging the gears to a shaft, the gear selector apparatus comprising a hydraulic actuator, a gear selection fork, a first pressure control valve, a second pressure control valve, a first position sensor and a controller. The hydraulic actuator has a piston slidably disposed in a bore. The piston and the bore define a first chamber and a second chamber. The gear selection fork engages with the piston and the synchronizer. The first pressure control valve is configured to selectively provide pressurized hydraulic fluid to the first chamber of the hydraulic actuator. The second pressure control valve is configured to selectively provide pressurized hydraulic fluid to the second chamber of the hydraulic actuator. The first position sensor is configured to detect an operating position of at least one of the gear selection fork, piston and synchronizer. The controller is in electrical communication with the first position sensor and the first and second pressure control valves. The controller includes a control logic. The control logic includes a first control logic for receiving a demand for engagement of at least one of the first and second gears with the shaft, a second control logic for activating at least one of the first and second pressure control valves, a third control logic for detecting and storing the operating position, a fourth control logic for receiving a demand for disengagement of at least one of the first and second gears from the shaft, a fifth control logic for recalling the operating position, a sixth control logic for determining which of the at least first and second pressure control valves to activate to disengage at least one of the first and second gears from the shaft based on the recalled operating position and a seventh control logic for activating at least one of the first and second pressure control valves to disengage at least one of the first and second gears.

In another example of the present invention, the control logic further includes an eighth control logic for detecting that at least one of first and second gears has been disengaged and a ninth control logic for deactivating at least one of the first and second pressure control valves.

In yet another example of the present invention, the gear selector apparatus further includes a guide bar fixed for common movement to the gear selection fork. The guide bar has a surface that includes at least one of a notch and a cam portion.

In yet another example of the present invention, the gear selection apparatus includes a detent mechanism configured to engage with the notch of the surface of the guide bar.

In yet another example of the present invention, the first position sensor is disposed adjacent the guide bar. The position sensor includes a roller in contact with at least one of the surface of the guide bar and the cam portion of the guide bar. The cam portion is aligned with the notch.

In yet another example of the present invention, the surface of the guide bar includes a first portion adjacent to the notch and a second portion adjacent to the first portion. The first portion and the notch are electrically conductive and the second portion is electrically insulated. A voltage is applied to the detent mechanism. The first position sensor includes the first portion, the second portion, the notch and the detent mechanism. When the detent mechanism is in contact with one of the first portion or the notch, the first position sensor receives the voltage and sends a signal to the controller.

In yet another example of the present invention, the piston includes a slot and the gear selection fork is engaged with the slot. The slot is slightly larger than the gear selection fork allowing for relative movement between the piston and the gear selection fork.

In yet another example of the present invention, the gear selector apparatus includes a second position sensor configured to detect a second operating position of the gear selection fork which is at least one of a first operating position, a second operating position and a neutral operating position.

In yet another example of the present invention, when the gear selection fork is in the first operating position the first position sensor is activated and the second position sensor is deactivated. When the gear selection fork is in the second gear position the first position sensor is deactivated and the second position sensor is activated. When the gear selection fork is in the neutral operating position the first position sensor and the second position sensor are activated.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
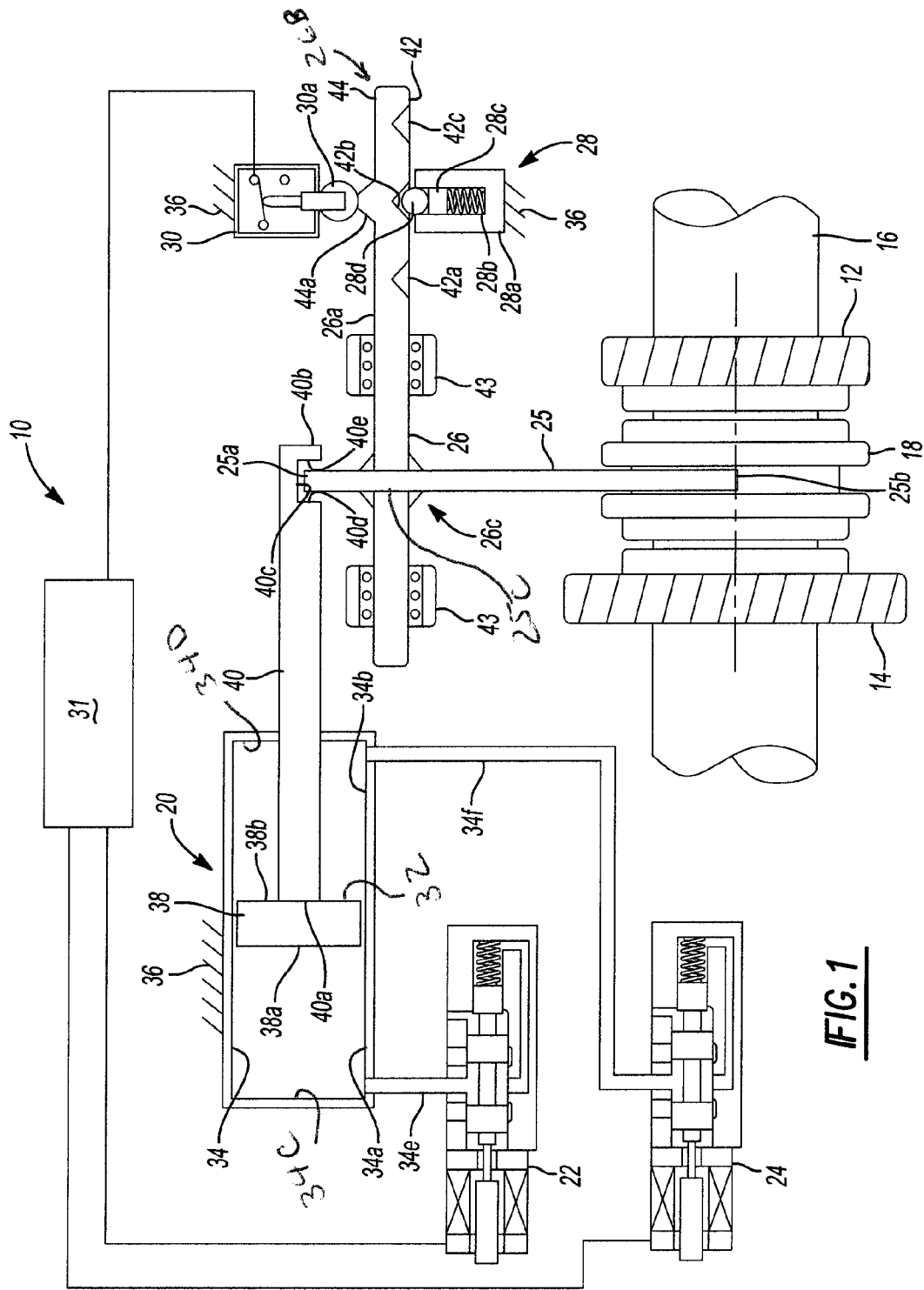
FIG. 1 is a schematic of a gear selector apparatus in accordance with an example of the present invention.

Referring to the drawings, wherein like reference numbers refer to like components, in FIG. 1 a schematic of an example of a gear selector apparatus 10 according to the principles of the present invention is shown and will now be described. The gear selector apparatus 10 is employed to engage and disengage a first gear 12 and a second gear 14 to a rotating shaft 16 by manipulating a synchronizer 18. The gear selector apparatus 10 includes a hydraulic actuator 20, a first and second pressure control valve 22, 24, a gear selection fork 25, a guide bar 26, a detent mechanism 28 and a position sensor or position switch 30 and is operated by a controller 31.

The hydraulic actuator 20 is a two-position actuator including a two-area piston 32 slidably disposed within a bore 34. The bore 34 is formed typically in a transmission housing 36 or other housing. The bore 34 is divided into a first portion 34A and a second portion 34B by the piston 32 and has a closed end 34C and a sealed end 34D opposite the closed end 34C. The first portion 34A is in communication with a first fluid passage 34E and the second portion 34B is in communication with a second fluid passage 34F. The first and second fluid passages 34E, 34F are in communication with the first and second pressure control valves 22, 24, respectively. Under command of the controller 31, the valves 22, 24 selectively provide pressurized fluid to the first and second portions 34A, 34B of the bore 34. However, it should be appreciated that other sources of pressurized fluid may be employed without departing from the scope of the invention. For example, the invention may include a multi-port spool valve having a single input port and two selectively pressurized output ports.

The piston 32 includes a head portion 38 and a rod portion 40. The head portion 38 has first and second surfaces 38A, 38B while the rod portion 40 includes a first and a second end 40A, 40B with the first end 40A fixed to the first surface 38A of the head portion 38. The rod portion 40 extends from the head portion 38 through the sealed end 34C of the bore 34 thus locating the second end 40B of the rod portion 40 outside the bore 34. A slot 40C is formed in the rod portion 40 proximate to the second end 40B. The slot 40C has a first and second wall 40D, 40E and is capable of engagement with the gear selection fork 25.

The gear selection fork 25 is a mechanical linkage between the piston 32 of the hydraulic actuator 20 and the synchronizer 18. The gear selection fork 25 translates the linear movement of the piston 32 to manipulate the synchronizer 18 and provides the axial movement required to engage the synchronizer 18 with either of the first and second gears 12, 14. The gear selection fork 25 includes a first end 25A and a second end 25B opposite the first end. The first end 25A is engaged with the slot 40C of the second end 40B of the rod portion 40 of the piston 32. The walls 40D, 40E of the slot 40C of the second end 40B of the piston 32 are spaced apart so that the slot 40C is slightly larger than the first end 25A of the gear selection fork 25. This arrangement provides for a slight amount of relative movement between the piston 32 and the gear selection fork 25, the purpose of which will be described in more detail below. The second end 25B of the gear selection fork 25 is formed to engage the synchronizer 18. The gear selection fork 25 also includes a middle portion 25C that is fixed to the guide bar 26.

The guide bar 26 has a fixed portion 26A and a notch portion 26B. The fixed portion 26A includes a fixation point 26C where the gear selection fork 25 is fixed to the guide bar 26. The notch portion 26B includes a first and a second edge 42, 44. The first edge includes a first, a second and a third notch 42A-C. The first, second and third notches 42A-C are formed to interact with the detent mechanism 28 which is mounted to the transmission housing 36 proximate to the notch portion 26B of the guide bar 26. The second edge 44 of the guide bar has at least one cam portion 44A. The cam portion 44A is formed to interact with the position switch 30 which is also mounted to the transmission housing 36. The guide bar 26 is restricted to linear movement by a pair of linear bearings 43 mounted on either side of the fixed portion 26A of the guide bar 26.

The detent mechanism 28 includes a housing 28A, a spring 28B, a plunger 28C and a ball 28D. The housing 28A is either formed in or fixed to the transmission housing 36. The plunger 28C is disposed in the housing 28A and the spring 28B is disposed between the plunger 28C and the housing 28A. The spring 28B applies a reaction force on the plunger 28C when the plunger 28C compresses the spring 28B. The ball 28D is disposed between the plunger and the first edge 42 of the notch portion 26A of the guide bar 26.

The position switch 30 is mounted to the transmission housing 36. The position switch 30 includes a spring-loaded roller 30A in contact with the second edge 44 of the notch portion 26A of the guide bar 26. The roller 30A is spring loaded to apply a constant force from the roller 30A so that the roller 30A follows the contour of the cam portion 44A of the second edge 44. The position switch 30 generates an "on" signal when the roller 30A is in contact with the cam portion 44A and an "off" signal when the roller 30A is not in contact with the cam portion 44A. However, it should be appreciated that other methods of sensing position may be employed without departing from the scope of the invention. For example, the invention may include a position switch 30 mounted to the transmission housing 36 as to detect the movement or position of other elements of the apparatus such as the piston 32, gear selection fork 25 and synchronizer 18.

The controller 31 generally includes an electronic control device, for example a transmission control module, having a preprogrammed digital computer or processor, control logic, memory used to store data, and at least one I/O peripheral. The control logic includes a plurality of logic routines for monitoring, manipulating, and generating data. The control logic may be implemented in hardware, software, or a combination of hardware and software. For example, control logic may be in the form of program code that is stored on the electronic memory storage and engine control unit table by the processor. The controller receives input data from the position switch 30, performs the control logic and sends command signals to the pressure control valves 22, 24. These control signals include, for example, on/off hydraulic signals.

A control logic may be implemented in software program code that is executable by the processor of the controller 31 for a control logic sequences. For example, such a control logic sequence is used when a demand is received to disengage the shaft 16 and synchronizer 18 from the first gear 12. The first control logic subsequence includes a first control logic for receiving a demand for engagement of at least one of the first and second gears 12, 14 with the shaft 16, a second control logic for activating at least one of the first and second pressure control valves 22, 24, a third control logic for detecting and storing the operating position, a fourth control logic for receiving a demand for disengagement of at least one of the first and second gears 12, 14 from the shaft 16, a fifth control logic for recalling the operating position, a sixth control logic for determining which of the at least first and second pressure control valves 22, 24 to activate to disengage at least one of the first and second gears 12, 14 from the shaft 16 based on the recalled operating position, a seventh control logic for activating at least one of the first and second pressure control valves 22, 24 to disengage at least one of the first and second gears 12, 14, an eighth control logic for detecting that at least one of first and second gears 12, 14 has been disengaged and a ninth control logic for deactivating at least one of the first and second pressure control valves 22, 24.

Figure 2:
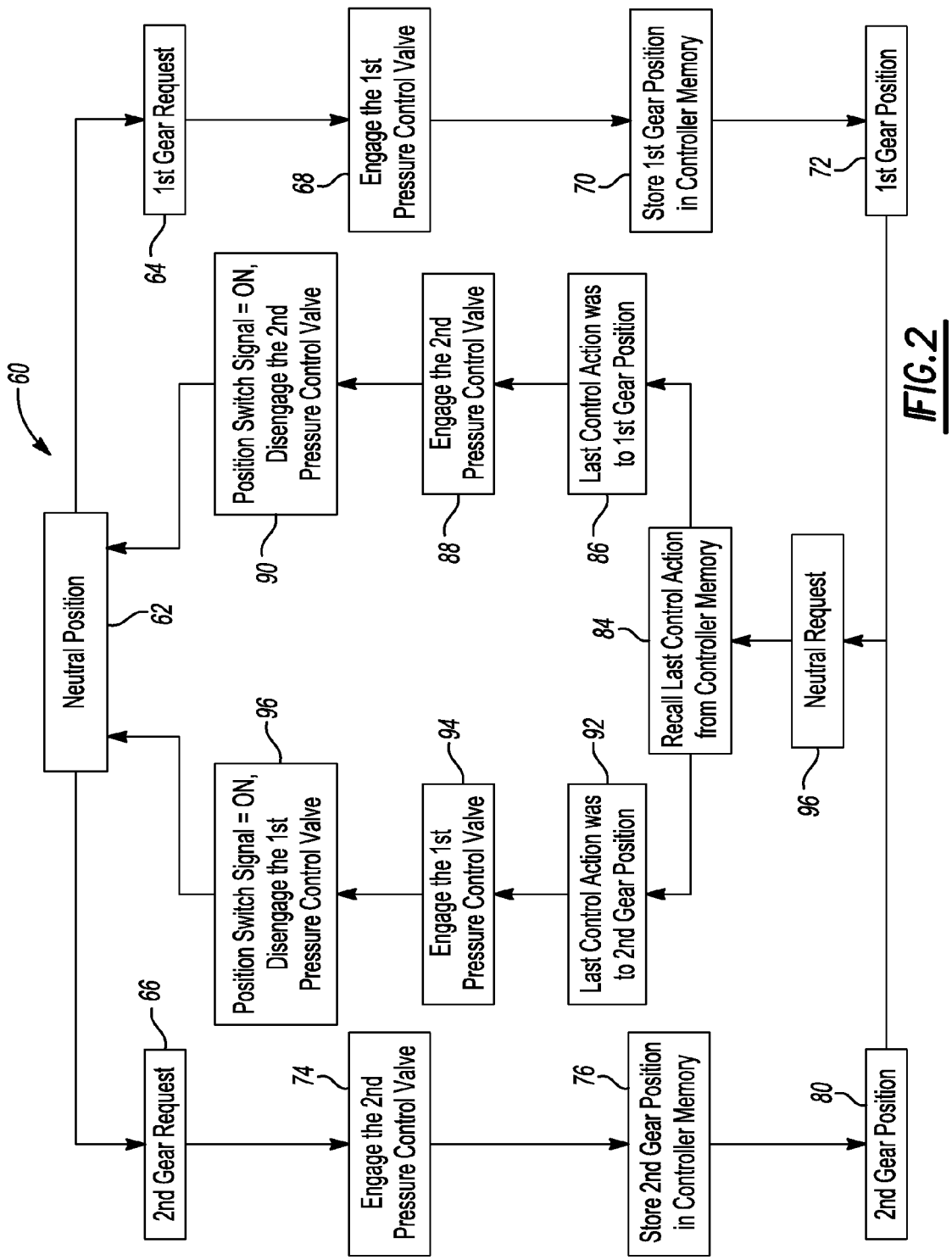
FIG. 2 is a flowchart of a method of operating the gear selector apparatus of FIG. 1.

Referring to FIG. 2, with continuing reference to FIG. 1, a flowchart of a method 60 for controlling the gear selector apparatus 10 executing the operation of the gear selector apparatus 10 will now be described. FIG. 1 illustrates the gear selector apparatus 10 in a neutral operating position. The method starts with block 62 in the neutral operating position and proceeds to either block 64 when a first gear request is made or to block 66 when a second gear request is made. For example, when a first gear request is made at block 64, the method proceeds to block 68 where the first pressure control valve 22 is activated to pressurize the first portion 34A of the bore 34 with hydraulic fluid. The hydraulic fluid fills and pressurizes the first portion 34A of the bore 34 thus implementing a resulting force on the first surface 38A of the head portion 38 of the piston 32. The force on the first surface 38A of the head portion 38 motivates the piston 32 towards the sealed end 34C of the bore 34. As the piston 32 moves so does the rod portion 40 and contact between the first wall 40D of the slot 40C and the first end 25A of the gear selection fork 25 forces the gear selection fork 25 to move in the same direction as the piston 32. Since the second end 25B of the gear selection fork 25 is engaged with the synchronizer 18, the synchronizer 18 also moves in the same direction towards the first gear 14. At the same time, the guide bar 26, fixed to the gear selection fork 25, also moves so that the ball 28D of the detent mechanism 28 starts to enter into the third notch 42C of the guide bar 26. Once the synchronizer 18 becomes synchronized with the first gear 14, the detent ball 28D enters the third notch 42C. At the same time as the detent ball 28D enters the third notch 42C, the roller 30A of the position switch 30 starts to exit the cam portion 44A of the second edge 44 of the guide bar 26 and moves the roller 30A into an "OFF" position. In block 70, the first gear position of block 72 is stored in the memory of the controller 31. The gear position will be used later in the method 60 so that the controller 31 knows the position of the synchronizer 18. In block 72, the synchronizer 18 is engaged in the first gear position.

When the second gear request is made at block 66, the method 60 proceeds to block 86 where the second pressure control valve 24 is activated to pressurize the second portion 34B of the bore 34 with hydraulic fluid. The hydraulic fluid fills and pressurizes the second portion 34B of the bore 34 thus implementing a resulting force on the second surface 38B of the head portion 38 of the piston 32. The force on the second surface 38B of the head portion 38 motivates the piston 32 away from the sealed end 34C of the bore 34. As the piston 32 moves so does the rod portion 40 which initiates contact between the first wall 40D of the slot 40C and the first end 25A of the gear selection fork 25. The contact forces the gear selection fork 25 to move in the same direction as the piston 32. Since the second end 25B of the gear selection fork 25 is engaged with the synchronizer 18, the synchronizer 18 also moves in the same direction towards the second gear 12. At the same time, the guide bar 26, fixed to the gear selection fork 25, also moves so that the ball 28D of the detent mechanism 28 starts to enter into the first notch 42A of the guide bar 26. Once the synchronizer 18 becomes synchronized with the first gear 14, the detent ball 28D enters the first notch 42A. At the same time as the detent ball 28D enters the first notch 42A, the roller 30A of the position switch 30 starts to exit the cam portion 44A of the second edge 44 of the guide bar 26 and moves the roller 30A into an "OFF" position. In block 76, the second gear position of block 80 is stored in the memory of the controller 31. Again, the gear position will be used later in the method 60 so that the controller 31 knows the position of the synchronizer 18. In block 72, the synchronizer 18 is engaged in the first gear position.

Depending upon the starting position of the gear selection bar 26, the neutral operating position is typically achieved by pressurizing one of the pressure control valves 22, 24. However, the method 60 may begin in either a first gear position at block 72 or a second gear position at block 80. For example, to move the synchronizer 18 from a first gear position to the neutral operating position, the method begins in block 72 in the first gear position. In block 82, a neutral request is made. In block 84, the controller recalls the stored gear position which in this case is the first gear position and the method is directed to block 86. In block 88, the second pressure control valve 24 is activated to pressurize the second portion 34B of the bore 34 with hydraulic fluid. The hydraulic fluid fills and pressurizes the second portion 34B of the bore 34 thus implementing a resulting force on the second surface 38B of the head portion 38 of the piston 32. The force on the second surface 38B of the head portion 38 motivates the piston 32 away from the sealed end 34C of the bore 34. As the piston 32 moves so does the rod portion 40 which initiates contact between the second wall 40E of the slot 40C and the first end 25A of the gear selection fork 25. This contact forces the gear selection fork 25 to move in the same direction as the piston 32. Since the second end 25B of the gear selection fork 25 is engaged with the synchronizer 18, the synchronizer 18 also moves in the same direction towards the neutral operating position and disengaging the first gear 14. At the same time, the guide bar 26, fixed to the gear selection fork 25, also moves so that the ball 28D of the detent mechanism 28 starts to enter into the second notch 42B of the guide bar 26. Once the ball 28D begins to enter the second notch 42B, the spring 28B, plunger 28C and ball 28D combination creates an additional force on the guide bar 26 pushing the guide bar 26 further in the same direction as the initial movement. The guide bar 26 in turn applies a force to the gear selector fork 25 which continues to move the gear selector fork 25 in the same direction even as the rod portion 40 of the piston 32 stops moving. As mentioned above, the lose fitting between the first end 25A of the gear selector fork 25 and the slot 40C of the rod portion 40 of the piston 32 allows the relative movement between the piston 32 and the gear selector fork 25. As the ball 28D continues deeper into the second notch 42B, the first end 25A of the gear selection fork 25 separates from the second wall 40E of the slot 40C of the rod portion 40. At the same time the detent ball 28D is entering the second notch 42B, the roller 30A of the position switch 30 starts to enter the cam portion 44A of the second edge 44 of the guide bar 26 and moves the roller 30A into an "ON" position. Next, in block 90, once the switch 30 is in the "ON" position, a signal is sent to the second pressure control valve 24 to cease pressurization and exhaust hydraulic fluid from the second portion 34B of the bore 34.

When the gear selector apparatus is in a second gear position 80, the method begins in block 80 in the second gear position. In block 82, a neutral request is made. In block 84, the controller recalls the stored gear position which in this case is the second gear position and the method is directed to block 92. In block 94, the first pressure control valve 22 is activated to pressurize the first portion 34A of the bore 34 with hydraulic fluid. The hydraulic fluid fills and pressurizes the first portion 34A of the bore 34 thus implementing a resulting force on the first surface 38A of the head portion 38 of the piston 32. The force on the first surface 38A of the head portion 38 motivates the piston 32 towards the sealed end 34C of the bore 34. As the piston 32 moves so does the rod portion 40 and contact between the first wall 40D of the slot 40C and the first end 25A of the gear selection fork 25 forces the gear selection fork 25 to move in the same direction as the piston 32. Since the second end 25B of the gear selection fork 25 is engaged with the synchronizer 18, the synchronizer 18 also moves in the same direction towards the neutral operating position and disengagement of the second gear 12. At the same time, the guide bar 26, fixed to the gear selection fork 25, also moves so that the ball 28D of the detent mechanism 28 starts to enter into the second notch 42B of the guide bar 26. Once the ball 28D begins to enter the second notch 42B, the spring 28B, plunger 28C and ball 28D combination creates an additional force on the guide bar 26 pushing the guide bar 26 in the same direction as the initial movement. The guide bar 26 in turn applies a force to the gear selector fork 25 which continues to move the gear selection fork 25 in the same direction even if the rod portion 40 of the piston 32 stops moving. As mentioned above, the lose fitting between the first end 25A of the gear selector fork 25 and the slot 40C of the rod portion 40 of the piston 32 allows the relative movement between the piston 32 and the gear selector fork 25. As the ball 28D continues deeper into the second notch 42B, the first end 25A of the gear selection fork 25 separates from the first wall 40D of the slot 40C of the rod portion 40. At the same time the detent ball 28D is entering the second notch 42B, the roller 30A of the position switch 30 starts to enter cam portion 44A of the second edge 44 of the guide bar 26 and moves the roller 30A into an "ON" position. Next, in block 92, once the switch 30 is in the "ON" position, a signal is sent to the first pressure control valve 22 to cease pressurization and exhaust hydraulic fluid from the first portion 34A of the bore 34.

Figures 3A, 3B:
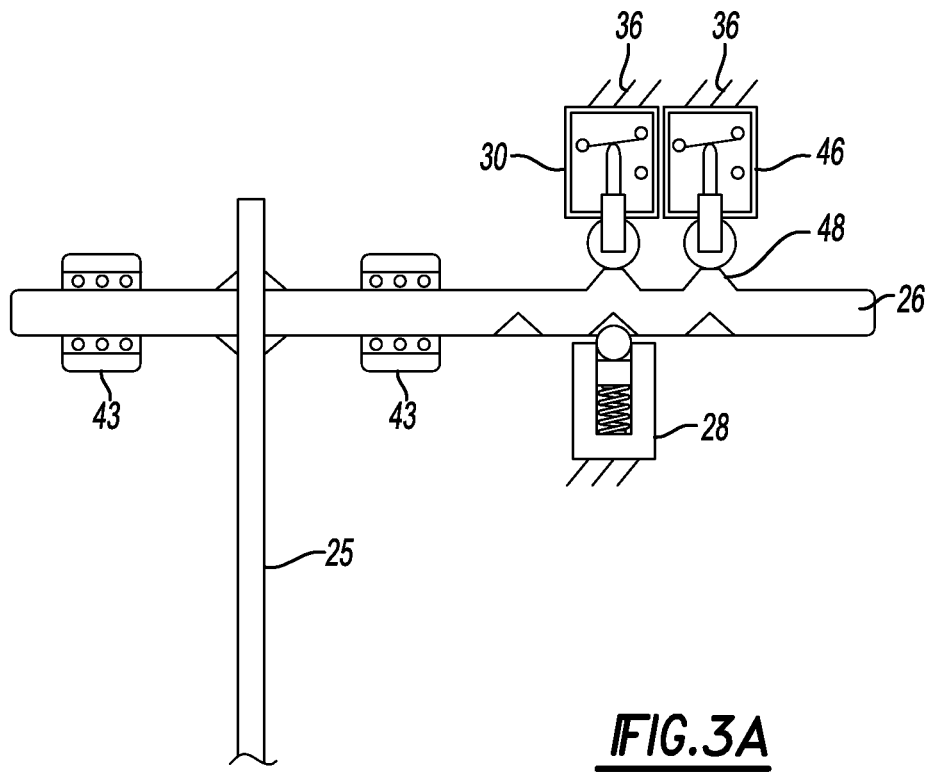
FIG. 3A is a schematic of a portion of a gear selector apparatus in accordance with another example of the present invention.
FIG. 3B is a table depicting the state of first and second position sensors in accordance with the example of the present invention depicted in FIG. 3A.

Referring to FIGS. 3A and 3B, another example of the invention including a second position sensor or switch 46 will now be described. As shown in FIG. 3A, the second position switch 46 is disposed next to the first position switch 30. An additional second cam portion 48 is also required to actuate the second position switch 46. The table shown in FIG. 3B organizes the state of the first and second position switches 30, 46 depending on the state of the synchronizer 18 position. When the synchronizer 18 is in the first gear 14 position, the first position switch 30 is in the "ON" position and the second position switch 46 is in the "OFF" position. When the synchronizer 18 is in the second gear 12 position, the first position switch 30 is in the "OFF" position and the second position switch 46 is in the "ON" position. When the synchronizer 18 is in the neutral operating position, both the first and second position switches 30, 46 are in the "ON" position.

Figure 4A:
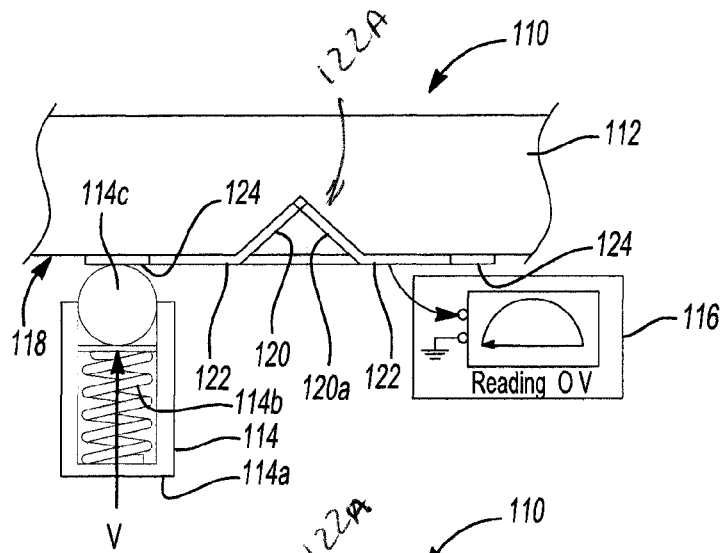
FIG. 4A is a schematic of an alternative position detection switch showing a detent ball, spring and a gear selector guide bar in a unengaged position.
Figure 4B:
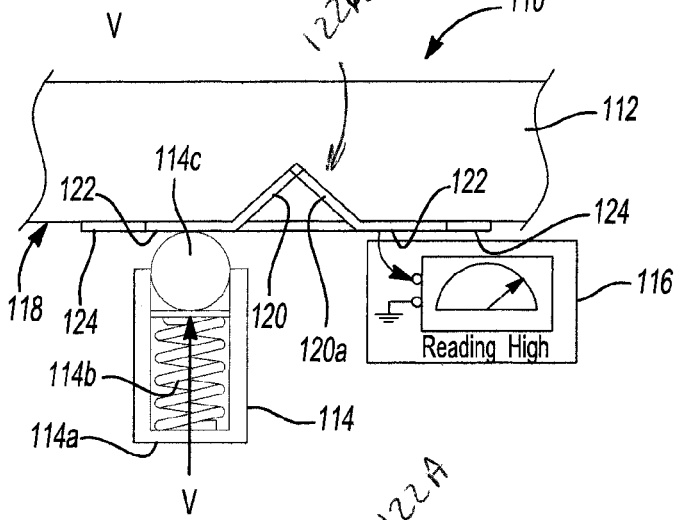
FIG. 4B is a schematic of an alternative position detection switch showing a detent ball, spring and a gear selector guide bar in a intermediate position.
Figure 4C:
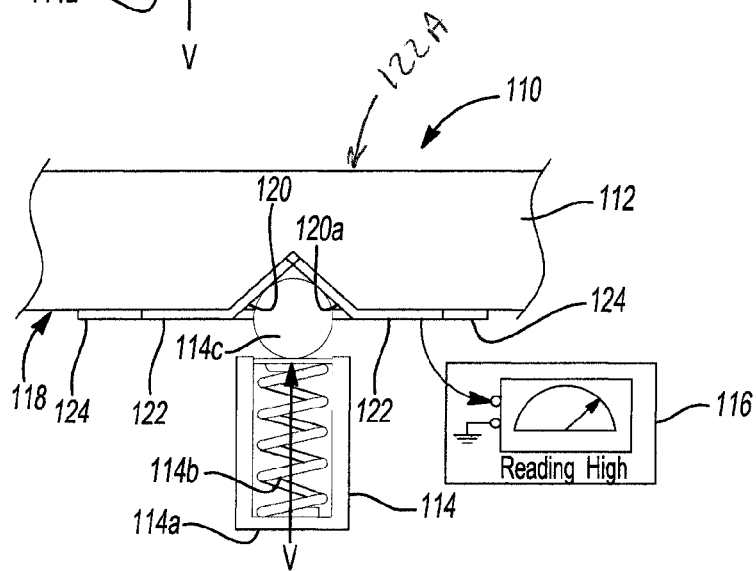
FIG. 4C is a schematic of an alternative position detection switch showing a detent ball, spring and a gear selector guide bar in an engaged position.

Referring to FIGS. 4A-4C, another example of the invention substitutes a built-in electric position sensor or switch 110 for the mechanical/electric position switch 30, 46 previously disclosed. For example, the guide bar 26 is replaced with a guide bar 112 and the detent mechanism 28 is replaced with a detent mechanism 114. The guide bar 112 and the detent mechanism 114 combine to provide a position signal to a controller 116. The guide bar 112 includes an edge 118 having a first, a second and a third portion 120, 122, 124. The second portion 122 includes a notch 122A and has a surface 122B including a conductive material. The first portion 120 of the edge 118 is immediately adjacent to the second portion 122 and has a surface 120A including the conductive material. The third portion 124 of the edge 118 is immediately adjacent to the second portion 122 and includes a surface 124A that is non-conductive. The detent mechanism 114 includes a housing 114A, a spring 114B and a ball 114C. The spring 114B is disposed between the ball 114C and the housing 114A while the ball 114C is in constant contact with the edge 118 of the guide bar 112. A voltage is applied to the detent mechanism 114 which, when the ball 114C is in contact with the first portion 120 of the edge 118, as in FIG. 4B, or the second portion 122, as in FIG. 4C, the position sensor 110 provides a position signal to the controller 116. When the ball 114C is in contact with the third portion 124 of the edge 118, as in FIG. 4A, the signal is not conducted to the controller 116 and the position of the ball 114C is known as not being in contact with the first portion 120 or the second portion 122.

The description of the invention is merely exemplary in nature and variations that do not depart from the gist of the invention are intended to be within the scope of the invention. Such variations are not to be regarded as a departure from the spirit and scope of the invention.

What is claimed is:

1. A gear selector apparatus for a transmission having a first gear, a second gear and a synchronizer for selectively engaging the gears to a shaft, the gear selector apparatus comprising:
  a hydraulic actuator having a piston slidably disposed in a bore, wherein the piston includes a head portion and a rod portion, the head portion and the bore define a first chamber and a second chamber, the rod portion has a first end and a second end opposite the first end, the first end is fixed to the head portion, and the second end includes a slot and extends through a hole at an end of the actuator;
  a gear selection fork having a first end and a second end, wherein the first end of the fork is engaged with the synchronizer and the second end of the fork is disposed in the slot of the rod of the piston;
  a first pressure control valve configured to selectively provide pressurized hydraulic fluid to the first chamber of the hydraulic actuator;
  a second pressure control valve configured to selectively provide pressurized hydraulic fluid to the second chamber of the hydraulic actuator;
  a first position sensor configured to detect an operating position of the gear selection fork;
  a guide bar fixed to the gear selection fork for common movement with the gear selection fork, wherein the guide bar has a surface, and wherein the surface includes at least one of a notch and a cam portion;
a controller in electrical communication with the first position sensor and the first and second pressure control valves, wherein the controller includes a control logic; and
a second position sensor configured to detect a second operating position of the gear selection fork which is at least one of a first gear position, a second gear position and a neutral operating position.

2. The gear selector apparatus of claim 1 wherein the control logic includes:
a first control logic for receiving a demand for engagement of at least one of the first and second gears with the shaft;
a second control logic for activating at least one of the first and second pressure control valves;
a third control logic for detecting and storing the operating position;
a fourth control logic for receiving a demand for disengagement of at least one of the first and second gears from the shaft;
a fifth control logic for recalling the operating position;
a sixth control logic for determining which of the at least first and second pressure control valves to activate to disengage at least one of the first and second gears from the shaft based on the recalled operating position;
a seventh control logic for activating at least one of the first and second pressure control valves to disengage at least one of the first and second gears;
an eighth control logic for detecting that at least one of first and second gears has been disengaged; and
a ninth control logic for deactivating at least one of the first and second pressure control valves.

3. The gear selection apparatus of claim 1 further comprising a detent mechanism configured to engage with the notch of the surface of the guide bar.

4. The gear selector apparatus of claim 3 wherein the first position sensor is disposed adjacent the guide bar, wherein the position sensor includes a roller in contact with at least one of the surface of the guide bar and the cam portion of the guide bar, wherein the cam portion is aligned with the notch.

5. The gear selector apparatus of claim 1 wherein the surface of the guide bar includes a first portion adjacent to the notch and a second portion adjacent to the first portion, wherein the first portion and the notch are electrically conductive and the second portion is electrically insulated, wherein a voltage is applied to the detent mechanism, and wherein the first position sensor includes the first portion, the second portion, the notch and the detent mechanism and when the detent mechanism is in contact with one of the first portion or the notch, the first position sensor receives the voltage and sends a signal to the controller.

6. The gear selector apparatus of claim 1 wherein the slot of the rod of the piston is slightly larger than the second end of the gear selection fork allowing for some relative movement between the piston and the gear selection fork.

7. The gear selector apparatus of claim 1 wherein when the gear selection fork is in the first gear position the first position sensor is activated and the second position sensor is deactivated, when the gear selection fork is in the second gear position the first position sensor is deactivated and the second position sensor is activated and when the gear selection fork is in the neutral operating position the first position sensor and the second position sensor are activated.

8. A gear selector apparatus for a transmission having a first gear, a second gear and a synchronizer for selectively engaging the gears to a shaft, the gear selector apparatus comprising:
a hydraulic actuator having a piston slidably disposed in a bore, wherein the piston includes a head portion and a rod portion, the head portion and the bore define a first chamber and a second chamber, the rod portion has a first end and a second end opposite the first end, the first end is fixed to the head portion, and the second end includes a slot and extends through a hole at an end of the actuator;
a gear selection fork having a first end and a second end, wherein the first end of the fork is engaged with the synchronizer and the second end of the fork is disposed in the slot of the rod of the piston;
a first pressure control valve configured to selectively provide pressurized hydraulic fluid to the first chamber of the hydraulic actuator;
a second pressure control valve configured to selectively provide pressurized hydraulic fluid to the second chamber of the hydraulic actuator;
a first position sensor configured to detect an operating position of at least one of the gear selection fork, piston and synchronizer;
a guide bar fixed for common movement to the gear selection fork, wherein the guide bar has a surface, and wherein the surface includes at least one of a notch and a cam portion; and
a controller in electrical communication with the first position sensor and the first and second pressure control valves, wherein the controller includes a control logic, the control logic including:
a first control logic for receiving a demand for engagement of at least one of the first and second gears with the shaft;
a second control logic for activating at least one of the first and second pressure control valves;
a third control logic for detecting and storing the operating position;
a fourth control logic for receiving a demand for disengagement of at least one of the first and second gears from the shaft;
a fifth control logic for recalling the operating position;
a sixth control logic for determining which of the at least first and second pressure control valves to activate to disengage at least one of the first and second gears from the shaft based on the recalled operating position; and
a seventh control logic for activating at least one of the first and second pressure control valves to disengage at least one of the first and second gears.

9. The gear selector apparatus of claim 8 wherein the control logic further includes:
an eighth control logic for detecting that at least one of first and second gears has been disengaged; and
a ninth control logic for deactivating at least one of the first and second pressure control valves.

10. The gear selection apparatus of claim 8 further comprising a detent mechanism configured to engage with the notch of the surface of the guide bar.

11. The gear selector apparatus of claim 10 wherein the first position sensor is disposed adjacent the guide bar, wherein the position sensor includes a roller in contact with at least one of the surface of the guide bar and the cam portion of the guide bar, wherein the cam portion is aligned with the notch.

12. The gear selector apparatus of claim 8 wherein the surface of the guide bar includes a first portion adjacent to the notch and a second portion adjacent to the first portion, wherein the first portion and the notch are electrically conductive and the second portion is electrically insulated, wherein a voltage is applied to the detent mechanism, and wherein the first position sensor includes the first portion, the second portion, the notch and the detent mechanism and when the detent mechanism is in contact with one of the first portion or the notch, the first position sensor receives the voltage and sends a signal to the controller.

13. The gear selector apparatus of claim 8 wherein the slot of the rod of the piston is slightly larger than the second end of the gear selection fork allowing for some relative movement between the piston and the gear selection fork.

14. The gear selector apparatus of claim 8 further comprising a second position sensor configured to detect a second operating position of the gear selection fork which is at least one of a first gear position, a second gear position and a neutral operating position.

15. The gear selector apparatus of claim 14 wherein when the gear selection fork is in the first gear position the first position sensor is activated and the second position sensor is deactivated, when the gear selection fork is in the second gear position the first position sensor is deactivated and the second position sensor is activated and when the gear selection fork is in the neutral operating position the first position sensor and the second position sensor are activated.

\* \* \* \* \*